United States Patent
Regier et al.

(12) 
(10) Patent No.: US 7,121,074 B1
(45) Date of Patent: Oct. 17, 2006

(54) BALANCED EPICYCLIC SICKLE DRIVE

(75) Inventors: Bernard D. Regier, Newton, KS (US); Jeffrey S. Funk, Hillsboro, KS (US)

(73) Assignee: ACCO Corporation, Duluth, GA (US)

( * ) Notice: Subject to any disclaimer, the term of this patent is extended or adjusted under 35 U.S.C. 154(b) by 0 days.

(21) Appl. No.: 11/141,603

(22) Filed: May 31, 2005

(51) Int. Cl.
*A01D 34/13* (2006.01)

(52) U.S. Cl. ............................................ 56/296; 74/44

(58) Field of Classification Search ................. 56/296, 56/17.6, 257, 12.6; 74/44
See application file for complete search history.

(56) References Cited

U.S. PATENT DOCUMENTS

| | | | | |
|---|---|---|---|---|
| 2,808,696 A | * | 10/1957 | Hall | 56/296 |
| 2,819,618 A | * | 1/1958 | Slusher | 74/44 |
| 3,112,652 A | * | 12/1963 | Freeborn | 74/44 |
| 3,546,864 A | * | 12/1970 | White | 56/296 |
| 3,657,868 A | * | 4/1972 | Cousino | 56/13.6 |
| 3,941,003 A | | 3/1976 | Garrison et al. | |
| 4,813,296 A | * | 3/1989 | Guinn | 74/595 |
| 4,942,725 A | * | 7/1990 | Ruder, Sr. | 56/16.9 |

OTHER PUBLICATIONS

Massey Ferguson Illustrated Parts List 220 Draper Headers (pp. 0, 2-10, 2-12)(3pgs) date Dec. 2001.
Hay & Forage Industries Parts Drawing titled "Gearbox Assembly" (700-150287) (1 pg) date Jul. 1998.
Hay & Forage Industries Parts Drawing titled "Gearbox-Sickle Drive" (700-717-930) (1 pg) date Jul. 1998.

* cited by examiner

*Primary Examiner*—Áprád Fábián Kovács
(74) *Attorney, Agent, or Firm*—Hovey Williams LLP (57) ABSTRACT

A counterbalancing epicyclic sickle drive has a pair of oppositely rotating weights that offset the inertial forces of the sickle during its abrupt acceleration and deceleration at opposite ends of its path of travel. One of the weights rotates with the main shaft of the drive about its longitudinal axis, while the second weight is fixed to an oppositely rotating crankshaft that orbits about the axis of the main shaft in eccentric relationship thereto. The weight on the main shaft is heavier than the weight on the crankshaft so as to offset changes in inertial forces produced by the crankshaft weight during increased acceleration of its center of gravity at opposite ends of its elliptical path of travel about the axis of the main shaft.

1 Claim, 7 Drawing Sheets

BALANCED EPICYCLIC SICKLE DRIVE

TECHNICAL FIELD

The present invention relates to harvesting equipment and, more particularly, to a smooth-running, counterbalancing drive for the reciprocating sickle of such a harvester.

BACKGROUND AND SUMMARY

Counterbalancing sickle drives are known in the art. See for example U.S. Pat. No. 3,941,003 owned by the assignee of the present invention. In that patent, a pair of equal counterbalance weights rotate in opposite directions about the axis of the main shaft of a gearbox that supplies driving power to the sickle. Each time the sickle approaches one end of its path of travel, the counter-rotating weights come into superimposed relationship with one another at the opposite end of the path of travel so as to counteract the inertia of the sickle. While this arrangement does a good job of counterbalancing the reciprocating sickle, it fails to compensate for the centrifugal force generated by an oscillating sway bar used in the translation of rotary motion from the gearbox to reciprocal motion of the sickle.

It is also known in the art to use an epicyclic drive for reciprocating a sickle. This entirely eliminates the need for an oscillating sway bar. However, until the present invention, no epicyclic sickle drive having the ability to counterbalance the reciprocating sickle has been available.

Accordingly, one important object of the present invention is to provide an epicyclic sickle drive that is capable of counterbalancing the sickle it reciprocates. In one preferred embodiment, the drive includes a crankshaft that orbits about the axis of a main shaft as the main shaft rotates, while simultaneously rotating oppositely from the main shaft. A drive stud on the crankshaft is offset from the axis of the crankshaft to such an extent that the stud simply moves back and forth in a straight line path of travel as the crankshaft orbits about the main shaft, thereby reciprocating the sickle that is bearing-coupled to the stud. The main shaft has a first counterbalance weight secured thereto that rotates with the main shaft during its operation. A second counterbalance weight is fixed to the crankshaft so that the crankshaft weight rotates oppositely from the main shaft weight. While the center of gravity of the main shaft weight moves at a constant velocity in a circular path of travel about the axis of the main shaft, the center of gravity of the crankshaft weight moves in an elliptical path of travel about that axis. Thus, the center of gravity of the crankshaft weight decelerates and accelerates adjacent opposite ends of its elliptical path of travel, creating a condition that must be compensated for by the main shaft weight. Accordingly, the main shaft weight is heavier than the crankshaft weight by an amount that produces the desired compensation.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
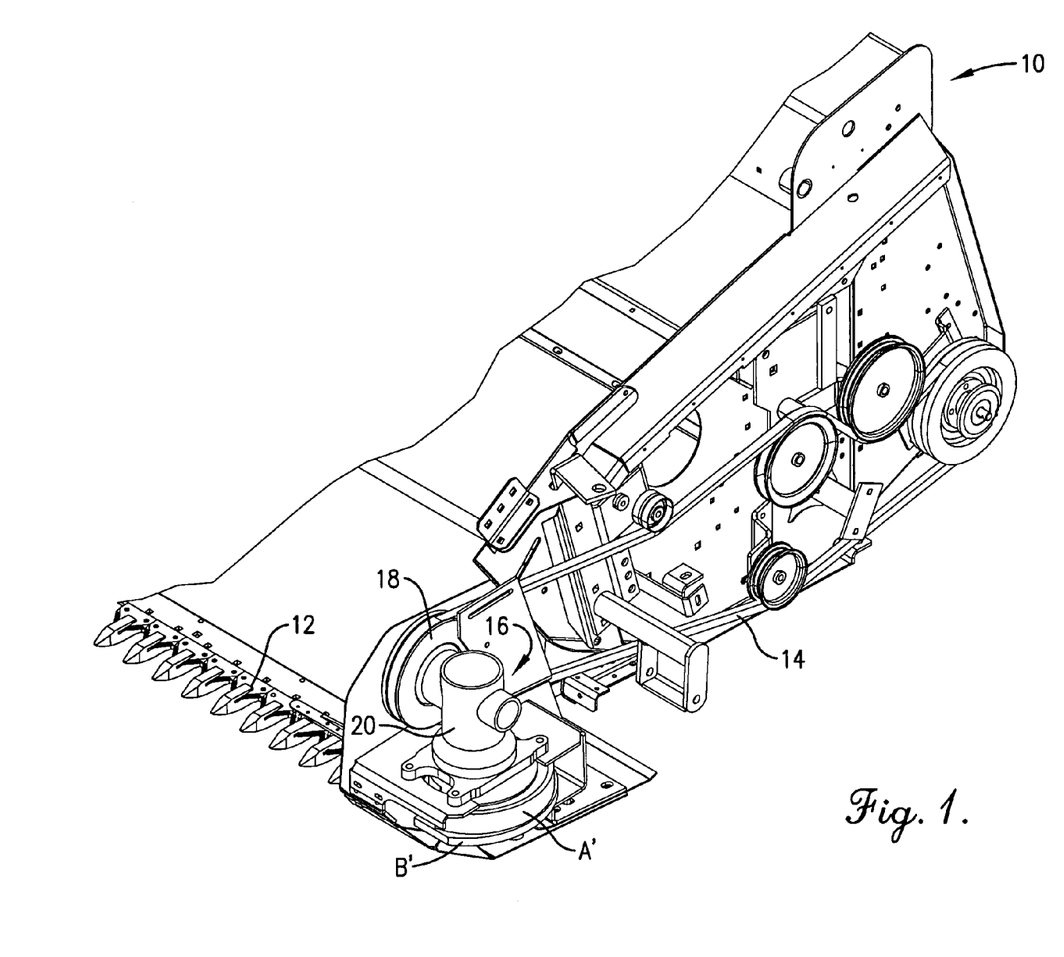
FIG. 1 is a fragmentary, left front isometric view of the header of a crop harvester employing a counterbalancing epicyclic sickle drive in accordance with the principles of the present invention.
Figure 2:
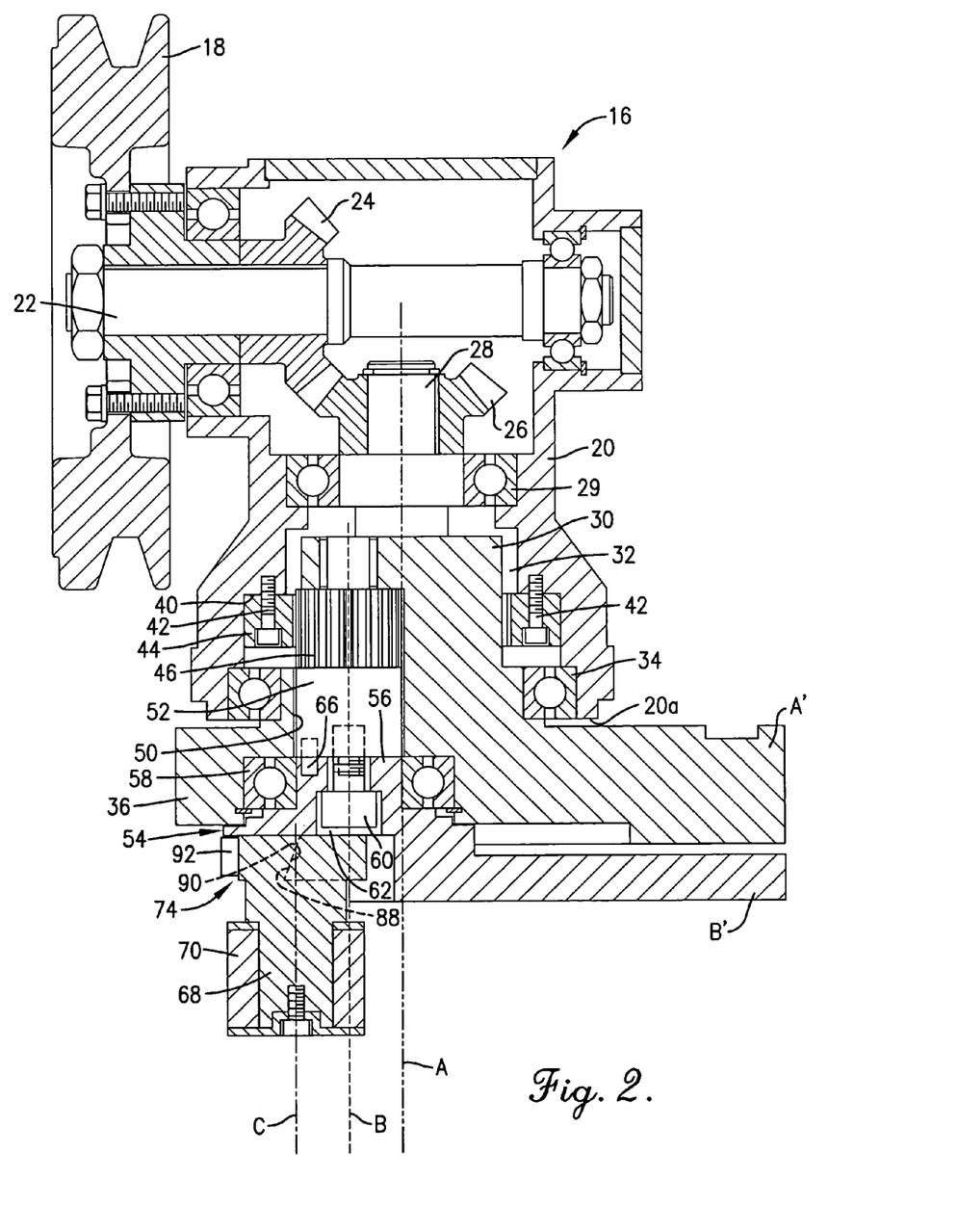
FIG. 2 is an enlarged vertical cross-sectional view through the drive.
Figure 3:
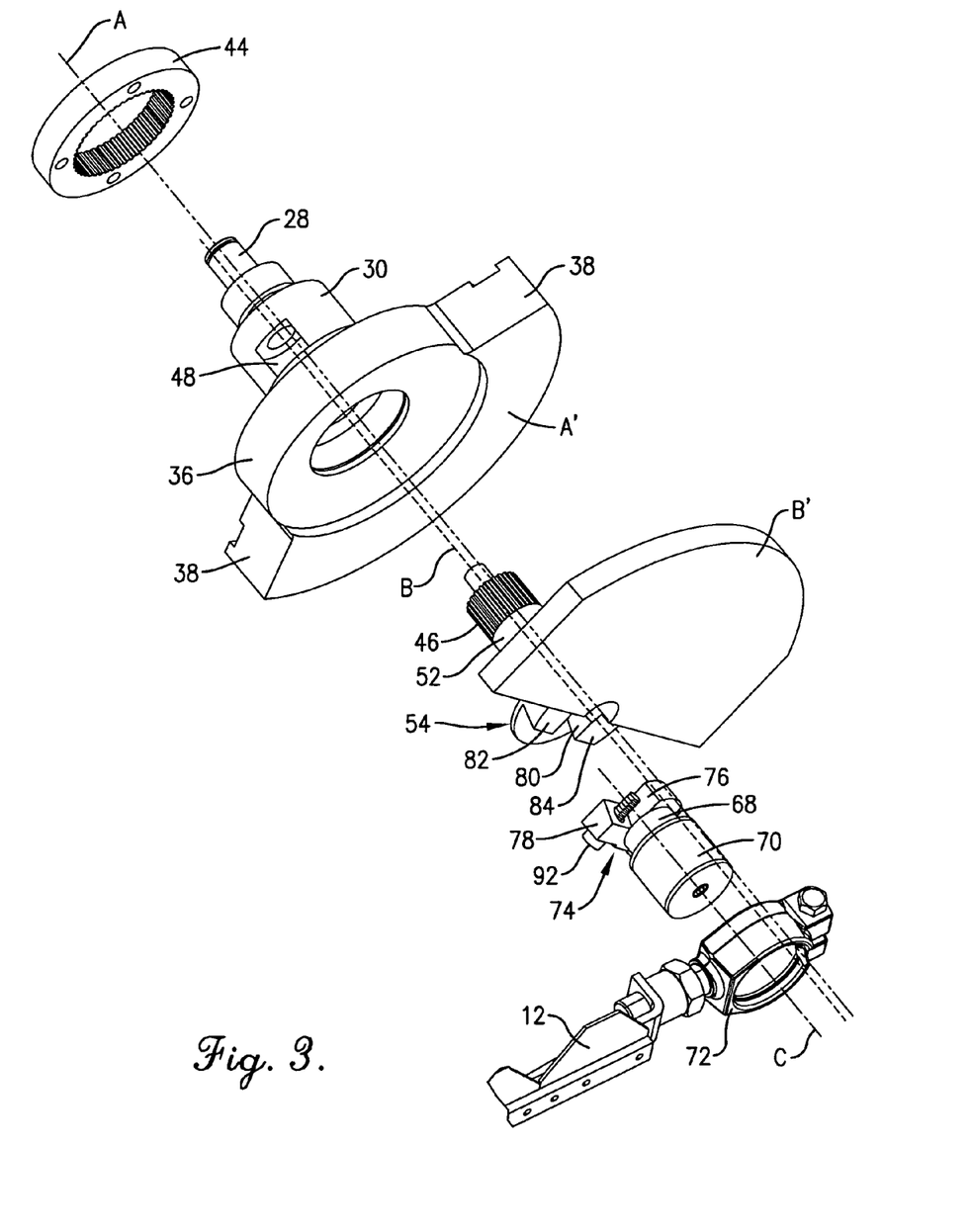
FIG. 3 is an exploded isometric view of the lower portion of the drive and connected sickle.
Figure 4:
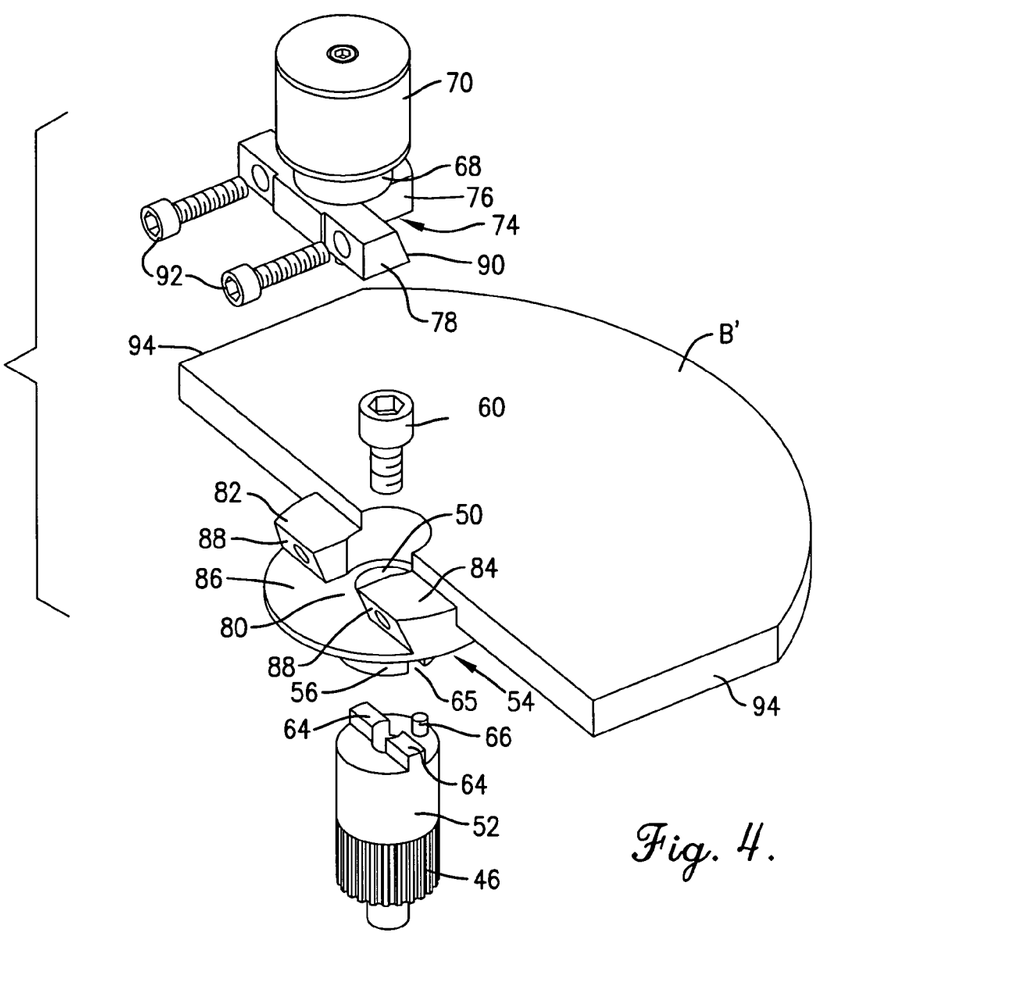
FIG. 4 is an inverted, exploded isometric view of the crankshaft weight and associated components to reveal details of construction.
Figure 5:
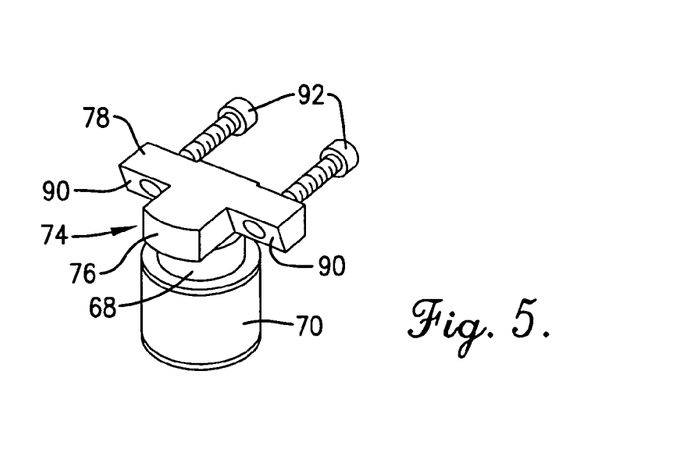
FIG. 5 is an isometric view of the drive stud taken from a different angle than the exploded view of FIG. 3 to reveal details of construction.

Referring initially to FIG. 1, a harvester has a header 10 having a sickle 12 at its lower front extremity for severing standing crops from the field as the harvester moves therethrough. At the left end of header 10 (as viewed from the rear of the machine looking forwardly), a belt drive assembly 14 receives driving power from a source (not shown) such as the mechanical driveline of a towing vehicle or the power output shaft of a self-propelled tractor on which the header 10 is mounted. Belt drive assembly 14 supplies input power to an epicyclic drive 16 coupled with sickle 12 for reciprocating the same across the front extremity of header 10. A sheave 18 transfers power from belt drive assembly 14 to epicyclic drive 16.

Referring now also to FIGS. 2–5, epicyclic drive 16 includes an upright, open bottom, generally cylindrical housing 20 rotatably supporting a transversely extending input shaft 22 adjacent its upper end. Input shaft 22 has an outer end that is fixed to sheave 18 for rotation by the latter. An internal bevel gear 24 is also fixed to shaft 22 and meshes with another internal bevel gear 26 that is fixed to an upright main shaft 28 rotatably supported within housing 20 by a bearing assembly 29 for rotation about an axis A.

Main shaft 28 is fairly short. Affixed to the lower end of main shaft 28 is a cylindrical member 30 that is rotatable with main shaft 28 within a cavity 32 in housing 20. At the lower open end 20a of housing 20, a bearing assembly 34 journals member 30 for rotation about axis A. Member 30 has an annular hub 36 fixed to the lower end thereof and positioned below lower end 20a of housing 20 for rotation outside of cavity 32. Hub 36 comprises an integral part of a first counterbalancing weight A' that is rotatable about axis A with main shaft 28. As seen in FIGS. 3 and 6–9, weight A' is generally sector-shaped and has a pair of opposite beveled ends 38.

Cavity 32 is stepped at multiple locations, including a location that presents an annular shoulder 40 recessed inwardly from lower end 20a of housing 20. Affixed to shoulder 40 by screws 42 is an internal ring gear 44 that is disposed concentrically with respect to axis A. An eccentrically disposed pinion gear 46 carried by member 30 projects through an access opening 48 (FIG. 3) in the sidewall of member 30 into meshing engagement with ring gear 44. Pinion gear 46 is thus caused to orbit about axis A when main shaft 28 rotates and to counter-rotate about an eccentric axis B oppositely from main shaft 28.

Weight A' and member 30 have a bore 50 therein concentric with axis B for receiving a crankshaft 52 integral with pinion gear 46. At its lower end, crankshaft 52 is secured to a second counterbalance weight B' for rotation with crankshaft 52 about axis B.

Weight B' has a boss 54 that includes an upwardly projecting stub shaft 56 journaled by a bearing assembly 58 that is pressed into an enlarged portion of bore 50. A fastening screw 60 within a counterbored hole 62 in stub shaft 56 extends into threaded engagement with the lower end of crankshaft 52 to secure weight B' to crankshaft 52. A pair of short drive teeth 64 on the lower end of crankshaft 52 project downwardly therefrom on opposite sides of fastening screw 60 into mating engagement with corresponding cross slots 65 in the upper end of stub shaft 56 to establish a driving connection between crankshaft 52 and weight B'. A locating pin 66 projects downwardly from crankshaft 52 into a mating hole in the upper end of stub shaft 56 to confirm that weight B' is properly positioned with respect to weight A'.

A drive stud 68 is coupled with crankshaft 52 in offset relation to axis B and has a longitudinal axis C. Stud 68 has a bearing sleeve 70 encircling the same for free rotation about axis C during orbiting of crankshaft 52 about axis A. Sickle 12 has a clamp 72 that embraces bearing sleeve 70 so as to couple sickle 12 with drive stud 68.

At its upper end, drive stud 68 has a generally T-shaped head 74 having a central tongue 76 and a transverse cross bar 78 at one end of tongue 76. Head 74 is configured to be matingly received by complementally configured structure on the underside of boss 54. In this respect, tongue 76 is received within a notch 80 defined between two downwardly projecting lugs 82 and 84 on the underside of boss 54, while cross bar 78 is received in a transverse undercut 86 behind lugs 82, 84. The rear faces 88 of lugs 82, 84 are beveled to match opposed, inclined front faces 90 of cross bar 78. Horizontally disposed screws 92 pass through cross bar 78 into lugs 82 and 84 to attach stud 68 to boss 54, and thus to crankshaft 52.

Weight B' is generally semi-circular about axis B and has a slightly larger radius than weight A'. Opposite ends of weight B' may be squared off to present flat ends 94. Weight A' is thicker and heavier than weight B' by an amount that compensates for the fact that the center of gravity of weight B' travels in an elliptical path of travel about axis A and accelerates at opposite ends of such path of travel as explained below. In one exemplary embodiment of the invention, the sickle 12 weighs approximately 45 lbs., the weight A' weighs approximately 18 lbs., and the weight B' weighs approximately 14 lbs. Input shaft 22 rotates at approximately 620 rpm, resulting in a sickle speed of approximately 565 strokes per minute (where one "stroke" is a complete back-and-forth cycle of the sickle) depending upon the gear ratios within drive 16. With these weights and speeds, the center of gravity of main shaft weight A' is desirably located approximately 64.3 millimeters from its axis of rotation A, while the center of gravity of crankshaft weight B' is desirably located approximately 63.9 millimeters from its axis of rotation B.

Operation

FIGS. 6–10 illustrate the movement of the counterbalance weights A' and B' during reciprocation of sickle 12. First, it is to be noted that the center of gravity of main shaft weight A' moves in a circular path of travel 94 about axis A'. The center of gravity of weight A' is denoted by a 5-pointed star in FIGS. 6–10 and bears the notation A". In contrast, the center of gravity of crankshaft weight B' moves in an elliptical path of travel 96 about axis A. The center of gravity of crankshaft weight B' is designated by an asterisk and is denoted by the designation B". It will be noted that maximum deceleration and acceleration of center of gravity B" occur at the 90° and 270° positions on elliptical path of travel 96, the center of gravity B" being disposed at a 0° position in FIG. 6.

FIGS. 6–10 are oriented as if the viewer is viewing the sickle 12 and drive 16 from the bottom thereof looking upwardly. In its FIG. 6 position, the sickle 12 is at the right end of its path of travel as the machine is viewed from the rear; thus, as viewed from the bottom in FIGS. 6–10, sickle 12 appears to be shifted fully to the left, while weights A' and B' are in their superimposed relationships fully to the right.

Figure 6:
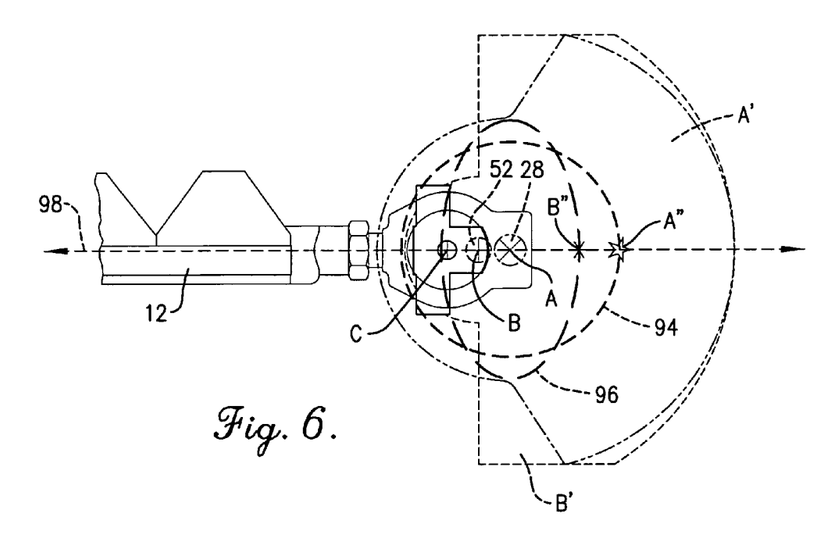
FIG. 6 is a fragmentary, schematic plan view from the bottom of the sickle and drive illustrating the relationship of key components when the sickle is at the left end of its stroke as viewed in FIG. 4.
Figure 7:
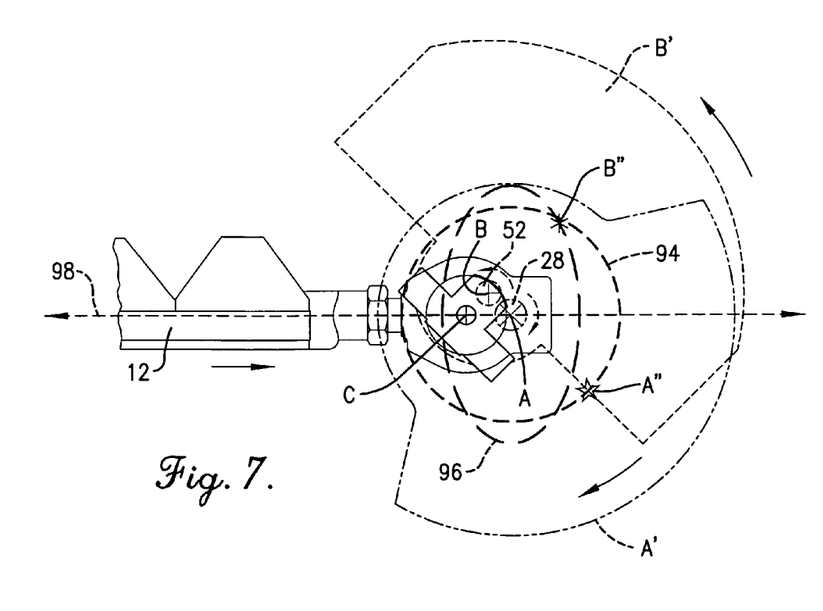
FIG. 7 is a bottom plan view similar to FIG. 6 with the sickle moved rightwardly through one-fourth of its path of travel, as FIG. 7 is viewed.

As main shaft 28 rotates clockwise 45° as illustrated in FIG. 7, main shaft weight A' correspondingly rotates clockwise about axis A and center of gravity A" moves 45° along path 94 to a four-thirty o'clock position from its three o'clock position of FIG. 6. Crankshaft 52 orbits 45° in a clockwise direction about axis A and simultaneously rotates 45° in a counterclockwise direction. This causes crankshaft weight B' to rotate 45° in a counterclockwise direction such that center of gravity B" moves 45° in a generally counterclockwise direction along elliptical path of travel 96 to approximately a one o'clock position. At the same time, axis C of drive stud 68 is thus caused to move rightwardly viewing FIG. 7 along a rectilinear path of travel 98 so that sickle 12 correspondingly moves rightward. The resulting leftwardly directed inertia of sickle 12 is compensated for by a combination of the rightwardly directed force vector of center of gravity A" and the rightwardly directed force vector of center of gravity B". The force vectors of centers of gravity A" and B" in a direction normal to path of travel 98 are equal to one another and in mutually opposite directions, thus canceling each other out.

Figure 8:
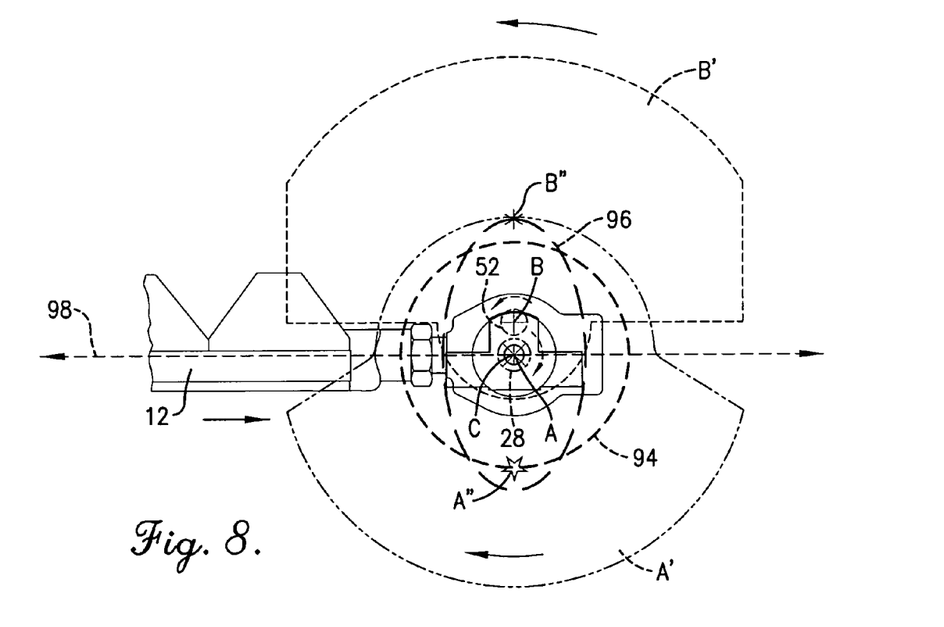
FIG. 8 is a bottom plan view similar to FIGS. 6 and 7 with the sickle moved to the right one-half of its path of travel, as FIG. 8 is viewed.

At the 90° position of FIG. 8, sickle 12 is halfway to its rightmost position that occurs at the 180° mark. Axis C is directly axially aligned with axis A, and axis B has orbited to a twelve o'clock position relative to axis A. At this halfway point the sickle 12 exerts zero pounds of resistive inertia and, correspondingly, weights A' and B' are directly opposed to one another at the six o'clock and twelve o'clock positions respectively so as to exert zero force in the rightward direction. Because center of gravity B" accelerates as it moves around the twelve o'clock position on its path of travel 96, weight B' generates enough inertial force to offset the force generated by the heavier weight A' at this time.

Figure 9:
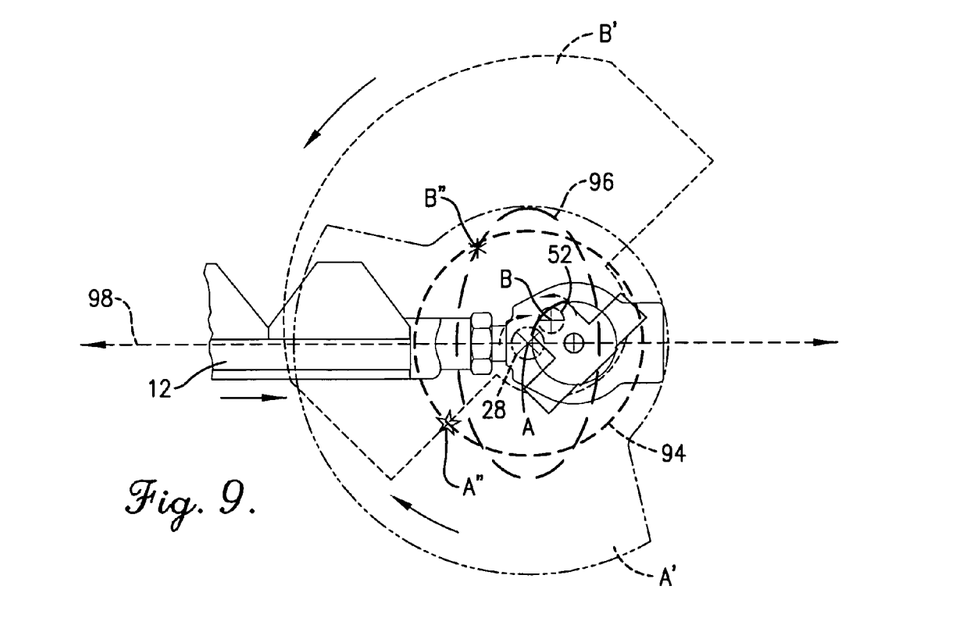
FIG. 9 is a bottom plan view similar to FIGS. 6–8 with the sickle moved to the right three-fourths of its full path of travel, as FIG. 9 is viewed.

FIG. 9 illustrates the sickle 12 at the 135° position, three-quarters of its full stroke to the right. At this point, center of gravity B" of weight B' is approximately at an eleven o'clock position on its path of travel 96, while center of gravity A" of weight A' is approximately at its seven thirty o'clock position on its path of travel 94. Weights A' and B' are beginning to overlap one another and sickle 12 is beginning to decelerate. Centers of gravity A" and B" exhibit force vectors in a leftward direction viewing FIG. 9 that, when combined, offset the inertial force in a rightward direction created by the decelerating sickle 12. The force vectors of centers of gravity A" and B" in a direction normal to the path of sickle travel 98 are in opposite directions and are equal to one another at this time so as to offset each other.

Figure 10:
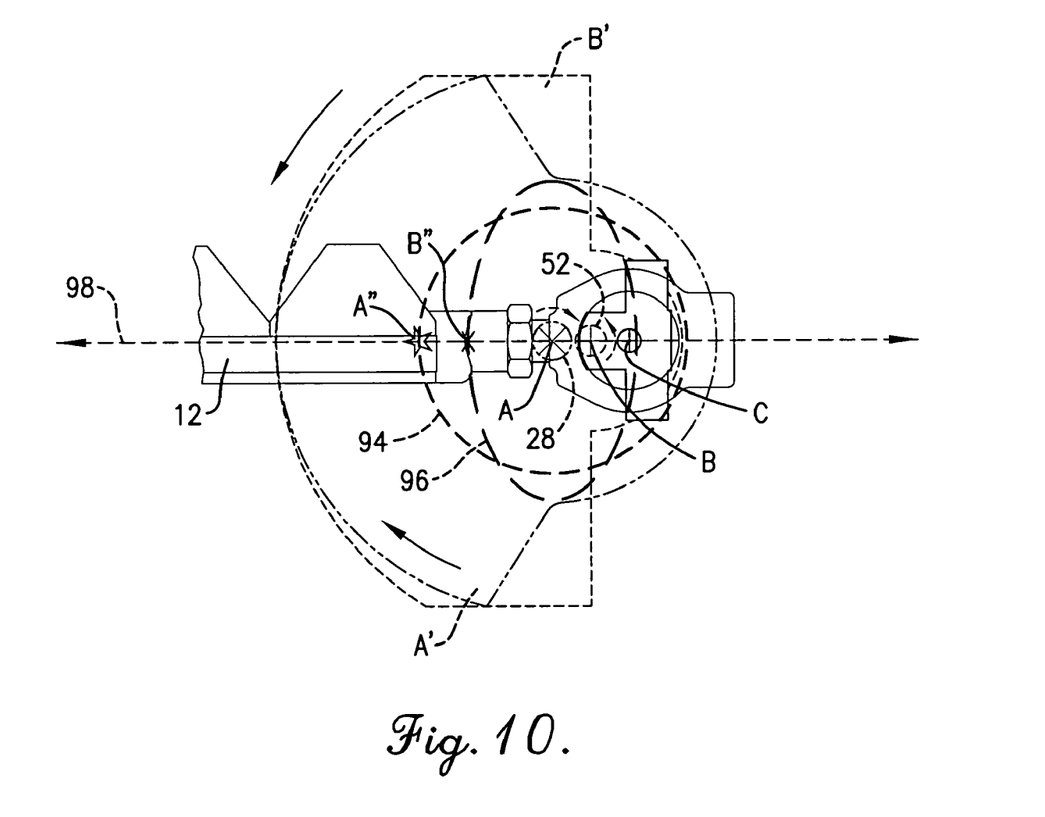
FIG. 10 is a bottom plan view similar to FIGS. 6–9 with the sickle at the rightmost end of its path of travel, as FIG. 8 is viewed.

In FIG. 10 the sickle 12 is at the rightmost end of path of travel 98. Weights A' and B' are fully superimposed upon one another and their centers of gravity A" and B" are at nine o'clock positions on their respective paths of travel 94 and 96. The inertial force caused by the decelerating sickle 12 reaches its maximum value in a rightward direction at this time, but that is offset by the combined inertial forces of the weights A' and B' in a leftward direction. The centers of gravity A" and B" of weights A' and B' respectively have no force vectors in a direction normal to the path of sickle travel 98 at this time.

During the next 180° of rotation of main shaft 52, sickle 12 accelerates and then decelerates in a leftward direction, with the weights A' and B' offsetting the resulting inertial force in a manner similar to that explained above with respect to the first 180° of rotation of main shaft 52. Center of gravity A" of weight A' continues in a clockwise movement along its path of travel 94 back to the three o'clock position corresponding to the 0° mark of main shaft 52, while center of gravity B" of weight B' continues on around its elliptical path of travel 96 in a counterclockwise direction until once again returning to the three o'clock position.

It will be seen that the offset position of drive stud C is so selected that it simply moves in a rectilinear path of travel back and forth along path of travel 98. Thus, sickle 12 has no arcuate component of its travel despite orbiting movement of crankshaft 52 about axis A of main shaft 28. As a consequence of using the counterbalancing epicyclic drive 16 of the present invention, operation of the sickle 12 is smooth and quiet.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In a harvester, the improvement comprising:
   a reciprocable sickle; and
   a counterbalancing epicyclic drive operably coupled with said sickle for reciprocating the same,
   said drive including:
      a main shaft rotatable about a first axis;
      a first counterbalance weight rotatable with said main shaft about said first axis;
      a crankshaft orbital about said first axis of rotation and rotatable about a second axis,
      said crankshaft being disposed to rotate in a direction opposite to the direction of rotation of the main shaft as the crankshaft orbits about said first axis;
      a second counterbalance weight rotatable with said crankshaft about said second axis; and
      a drive stud operably coupled with said crankshaft in offset relationship with said second axis,
   said sickle being operably coupled with said drive stud,
   said first counterbalance weight being heavier than the second counterbalance weight by an amount that compensates for the eccentric relationship between said first and second axes.

* * * * *